(12) United States Patent
Geraets et al.

(10) Patent No.: US 9,463,396 B1
(45) Date of Patent: Oct. 11, 2016

(54) DUAL TANK HEAT TRANSFER SYSTEM AND METHODS OF OPERATION

(75) Inventors: James M. Geraets, Sioux Falls, SD (US); William C. Miller, Sioux Falls, SD (US); Rodney Duane Pierson, Dell Rapids, SD (US); Christopher Michael Bieber, Sioux Falls, SD (US); James M. Schwarz, Brandon, SD (US); Rachel L. Kloos, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 880 days.

(21) Appl. No.: 13/252,708

(22) Filed: Oct. 4, 2011

Related U.S. Application Data

(60) Provisional application No. 61/389,569, filed on Oct. 4, 2010.

(51) Int. Cl.
 *B01D 3/00* (2006.01)
 *F28D 20/00* (2006.01)

(52) U.S. Cl.
 CPC ........... *B01D 3/007* (2013.01); *F28D 20/0034* (2013.01)

(58) Field of Classification Search
 CPC .......... B01D 3/00; B01D 3/007; B01D 5/00; B01D 5/0003; F28D 20/20; F28D 20/0034; F28D 2020/0082; F28D 2021/0063; F28D 2021/0066
 See application file for complete search history.

(56) References Cited

U.S. PATENT DOCUMENTS

| | | | | |
|---|---|---|---|---|
| 3,205,640 A * | 9/1965 | Smith | | 95/158 |
| 3,907,509 A * | 9/1975 | Spevack | | 422/622 |
| 4,722,193 A * | 2/1988 | Purvis et al. | | 62/81 |
| 5,190,249 A * | 3/1993 | Whitmire | | B64F 5/0063 244/134 C |
| 5,249,436 A * | 10/1993 | Hemsath | | 62/476 |
| 5,262,013 A * | 11/1993 | Beal et al. | | 203/18 |
| RE34,747 E * | 10/1994 | Petty et al. | | 62/238.3 |
| 5,868,105 A * | 2/1999 | Evans | | 123/41.5 |
| 6,098,576 A * | 8/2000 | Nowak et al. | | 123/41.33 |
| 6,675,437 B1 * | 1/2004 | York | | 15/321 |
| 2004/0007011 A1 * | 1/2004 | Tanaka | | 62/434 |
| 2005/0145370 A1 * | 7/2005 | Merryfull | | 165/104.19 |
| 2007/0000769 A1 * | 1/2007 | Brown | | 203/19 |
| 2008/0127649 A1 * | 6/2008 | Marnoch | | 60/650 |
| 2010/0031953 A1 * | 2/2010 | Penev et al. | | 126/615 |
| 2010/0109323 A1 * | 5/2010 | Russberg et al. | | 290/7 |

* cited by examiner

*Primary Examiner* — Renee E Robinson
*Assistant Examiner* — Jonathan Miller
(74) *Attorney, Agent, or Firm* — Amin, Turocy & Watson LLP

(57) ABSTRACT

A system for transferring heat from an ethanol and water vapor stream is disclosed as having a first heat exchanger, a valve system coupled to first heat exchanger and a first tank, a second tank coupled to the valve system, a second heat exchanger coupled to first tank and second tank, and a pipe line connecting the second tank to the first heat exchanger. A method for transferring heat is provided and involves intermittently cooling a first media, transferring heat from the first media to a second media, and directing the second media to a valve system. The valve system directs a flow of the second media to the first tank when a temperature of second media is above a temperature set point and directs the flow of the second media to the second tank when the temperature of second media is below the temperature set point.

32 Claims, 8 Drawing Sheets

DUAL TANK HEAT TRANSFER SYSTEM AND METHODS OF OPERATION

CROSS-REFERENCE TO RELATED APPLICATIONS

This application claims the benefit of U.S. Provisional Application Ser. No. 61/389,569, filed Oct. 4, 2010, and entitled "DUAL TANK HEAT TRANSFER SYSTEM AND METHODS OF OPERATION", the disclosure of which is incorporated herein by reference.

FIELD

The subject disclosure relates to a system for recovering heat using a dual tank heat transfer system.

BACKGROUND

Heat exchangers can be used to transfer heat from one liquid or gas stream to another liquid or gas stream. Within the heat exchanger, the streams are separated by a wall that is typically constructed of heat conducting metal. Various types of heat exchangers can be utilized (e.g., shell and tube heat exchanger, plate-and-frame heat exchanger, finned coil heat exchanger, and so forth). A heat exchanger's capacity is limited by, for example, its size, the flow rate of the streams, and the temperature difference between the streams. A minimum temperature difference between the streams (the approach temperature) is typically approximately 5 degrees Celsius. Heat exchangers can be operated under pressure to keep the streams in a liquid phase.

An ethanol production plant is an example of a facility that utilizes heat exchangers. Ethanol can be produced from grain-based feedstocks (e.g., corn, sorghum/milo, barley, wheat, etc.), from sugar (e.g., sugar cane, sugar beets, etc.), or from biomass (e.g., lignocellulosic feedstocks, such as switchgrass, corn cobs and stover, wood, or other plant material). An ethanol facility that produces ethanol from corn typically employs a process wherein corn is ground to a flour, mixed with water and enzymes to break down the starch contained in the corn into sugar (e.g. glucose) and fermented into a fermentation product by yeast. The ethanol is recovered from the fermentation product in a distillation system and is dehydrated using molecular sieves. Many unit operations within the ethanol production process require temperature control. For example, streams, such as the fermentation product (e.g., beer), process water, different ethanol streams, and distillate are typically cooled or heated through the use of heat exchangers. An ethanol production facility may experience seasonal changes in the need for cooling capacity. For example, during the warmer months an ethanol production facility typically will experience an increased need for cooling capacity.

SUMMARY

The disclosed aspects relate to a system for transferring heat liberated by condensing an ethanol and water vapor stream comprising: a first heat exchanger, a valve system coupled to the first heat exchanger, a first tank coupled to the valve system, a second tank coupled to the valve system, a second heat exchanger coupled to the first tank and the second tank, and a pipe line connecting the second tank to the first heat exchanger.

The disclosed aspects also relate to a method for transferring heat. The method comprises intermittently cooling a first media in a heat exchanger wherein heat is transferred to a second media and directing the second media to a valve system. The valve system has a temperature set point. The heat exchanger can comprise counter current flow. The valve system directs a flow of the second media to a first tank when a temperature of the second media is at or above the temperature set point. The valve system directs the flow of the second media to a second tank when the temperature of the second media is below the temperature set point. According to an aspect, the valve system comprises a first valve and a second valve. The first valve opens and the second valve closes directing the flow of the second media to the first tank when the temperature of the second media is above the temperature set point. The first valve closes and the second valve opens directing the flow of the second media to the second tank when the temperature of the second media is below the temperature set point.

DESCRIPTION OF THE EMBODIMENTS

The disclosed aspects provide for a system that increases the cooling capacity of a cooling system. The disclosed aspects also provide for a system that increases the capacity of a cooling system without needing to increase the size of the system as a whole.

Figure 1A:
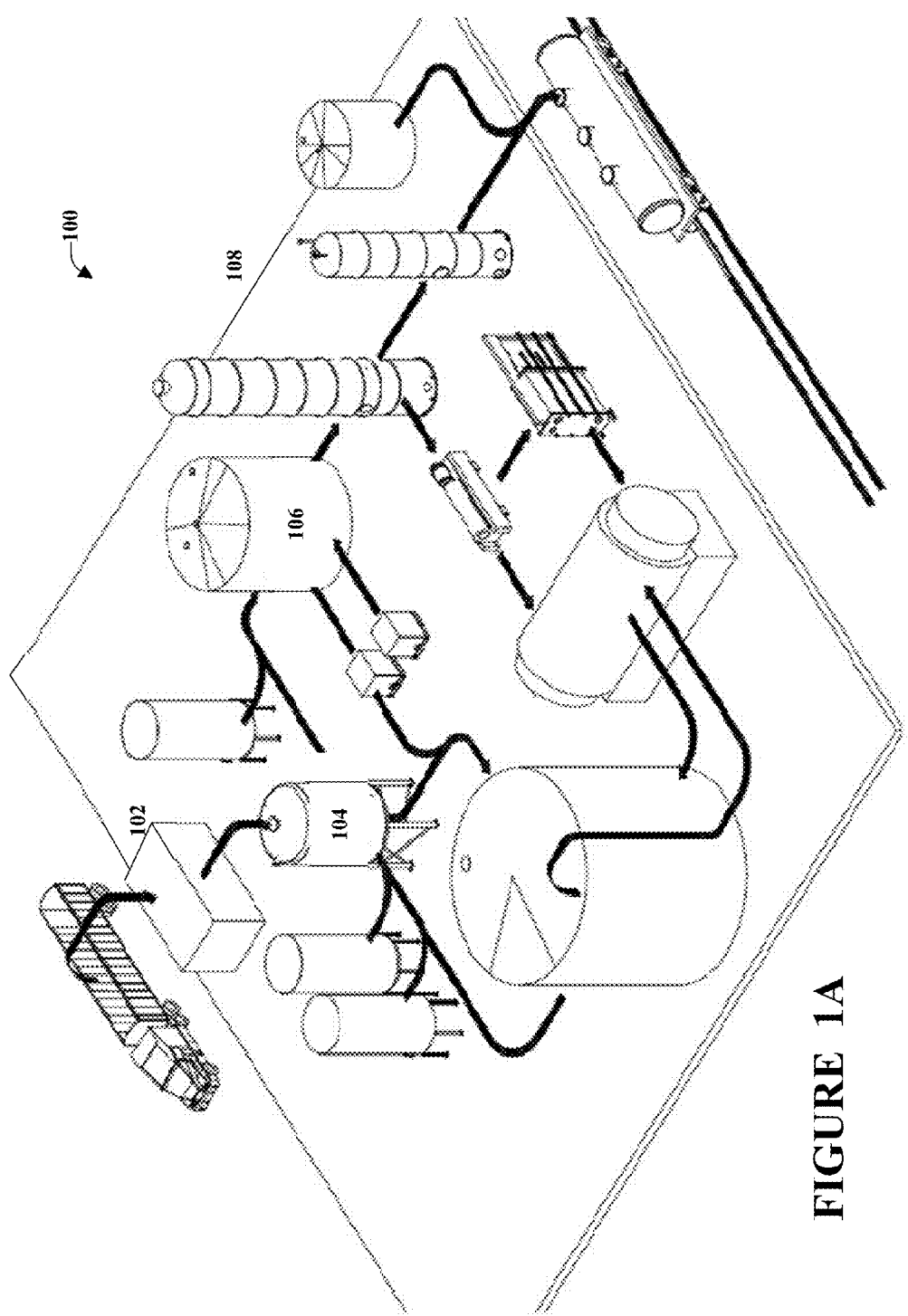
FIG. 1A is a perspective view of a biorefinery comprising an ethanol production facility.

Referring initially to FIG. 1A, an example biorefinery 100 comprising an ethanol production facility configured to produce ethanol from corn is shown. The example biorefinery 100 comprises an area 102 where corn (or other suitable material including, but not limited to, biomass, sugars, and other starch products) is delivered and prepared to be supplied to the ethanol production facility. The ethanol production facility comprises an apparatus 104 for preparation and treatment (e.g., milling) of the corn into corn flour suitable for fermentation into fermentation product in a fermentation system facility 106. The ethanol production facility comprises a distillation system 108 in which the fermentation product is distilled and dehydrated into ethanol. As shown in FIG. 1A, the biorefinery 100 may also comprise, in some embodiments, a by-product treatment system (shown as comprising a centrifuge, a dryer, and an evaporator).

Figure 1B:
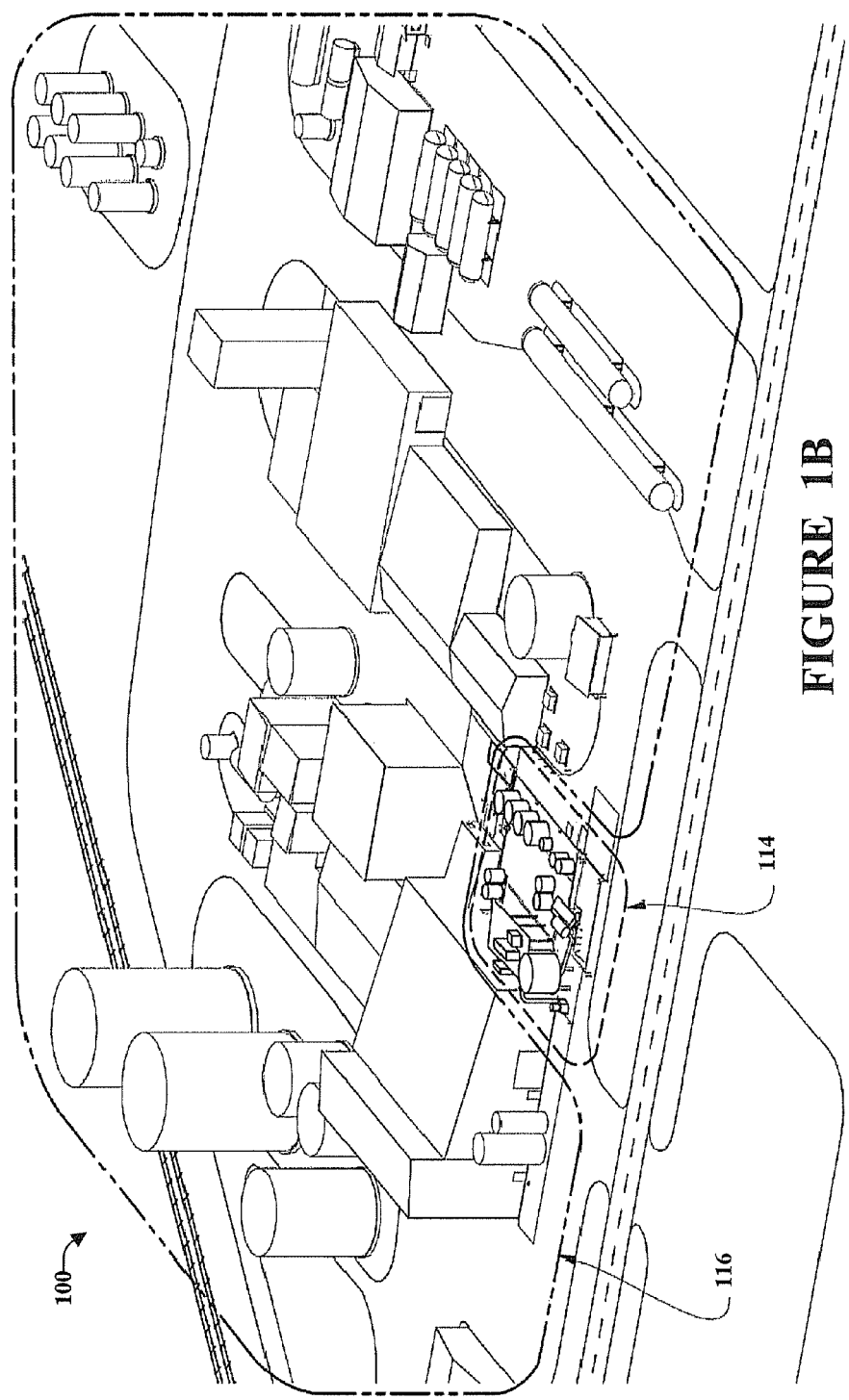
FIG. 1B is a perspective view of a biorefinery comprising a cellulosic ethanol production facility and a corn-based ethanol production facility.

As shown in FIG. 1B, according to an exemplary embodiment, the biorefinery 100 may comprise a cellulosic ethanol production facility 114 (which produces ethanol from lignocellulosic material and components of the corn plant) co-located with a corn-based ethanol production facility 116

(which produces ethanol from starch contained in the endosperm component of the corn kernel). As indicated in FIG. 1B, by co-locating the two ethanol production facilities, certain plant systems may be shared, for example, systems for dehydration, storage, denaturing and transportation of ethanol, energy/fuel-to-energy generation systems, plant management and control systems, and other systems. Corn fiber (a component of the corn kernel), which can be made available when the corn kernel is prepared for milling (e.g. by fractionation) in the corn-based ethanol production facility, may be supplied to the cellulosic ethanol production facility as a feedstock. Fuel or energy sources such as methane or lignin from the cellulosic ethanol production facility may be used to supply power to either or both co-located facilities. According to other alternative embodiments, a biorefinery (e.g. a cellulosic ethanol production facility) may be co-located with other types of plants and facilities, for example an electric power plant, a waste treatment facility, a lumber mill, a paper plant, or a facility that processes agricultural products.

Figure 2A:
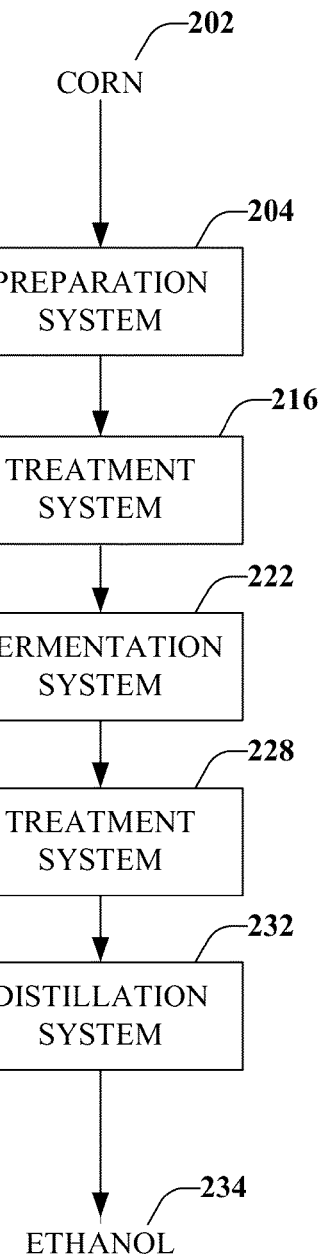
FIGS. 2A and 2B are schematic block diagrams of ethanol production processes, in accordance with some embodiments.
Figure 2B:
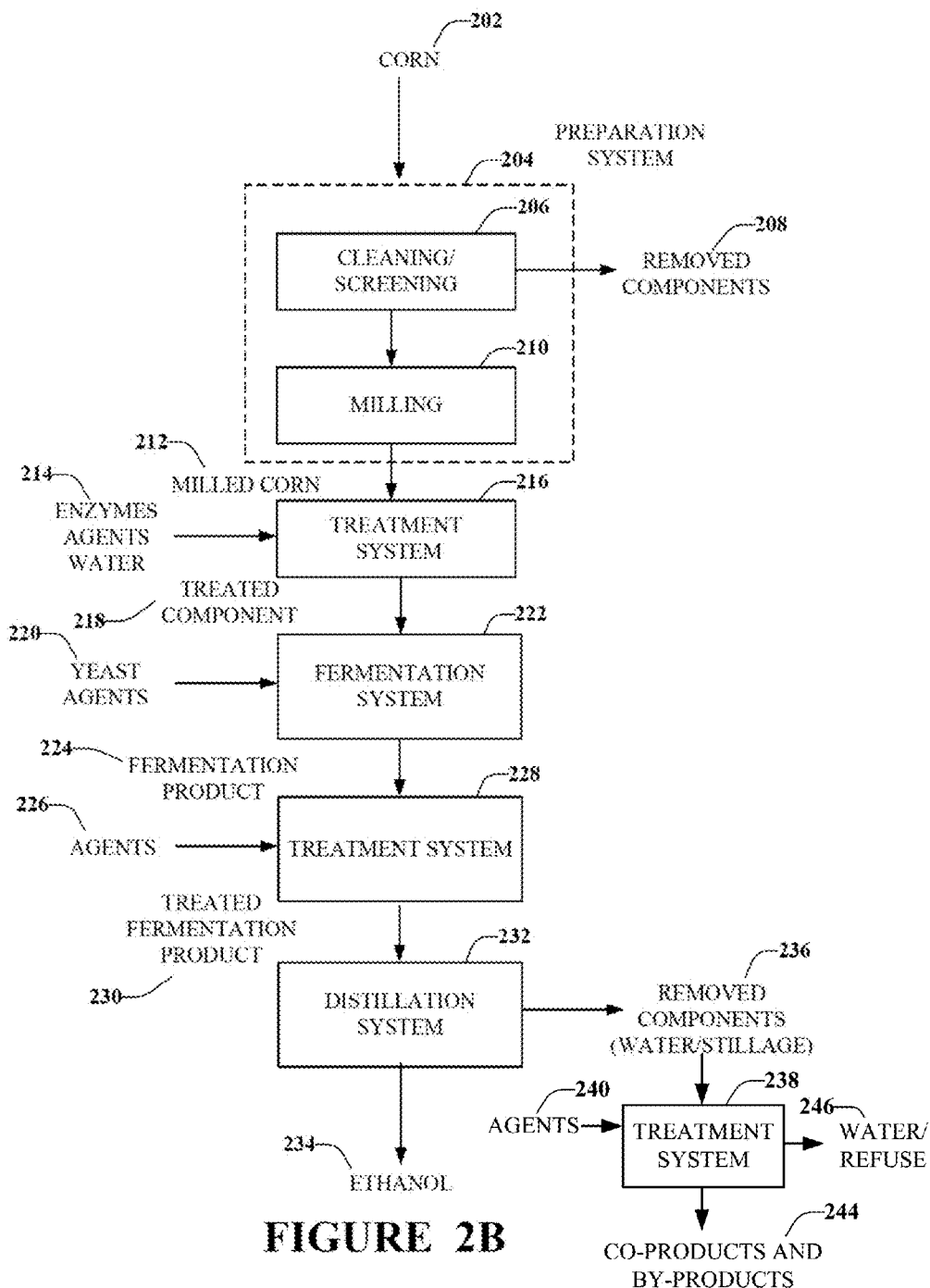

Referring to FIGS. 2A and 2B, in an ethanol production process, corn 202 (or other suitable feed material) can be prepared for further treatment in a preparation system 204. As seen in FIG. 2B, the preparation system 204 may comprise cleaning or screening 206 to remove foreign material, such as rocks, dirt, sand, pieces of corn cobs and stalk, and other unfermentable material (e.g., removed components 208). After cleaning or screening 206, the particle size of corn can be reduced by milling 210 to facilitate further processing. The corn kernels may also be fractionated into starch-containing endosperm, fiber, and germ, in accordance with some embodiments. The milled corn 212 or endosperm is slurried with water, enzymes and agents 214 to facilitate the conversion of starch into sugar (e.g. glucose), such as in a first treatment system 216. The sugar (e.g., treated component 218) is converted into ethanol by an ethanologen (e.g. yeast or other agents 220) in a fermentation system 222. The product of fermentation (fermentation product 224) is beer, which comprises a liquid component, including ethanol and water and soluble components, and a solids component, including unfermented particulate matter (among other things). The fermentation product 224 can be treated with agents 226 in a second treatment system 228. The treated fermentation product 230 is sent to a distillation system 232. In the distillation system 232, the (treated) fermentation product 230 is distilled and dehydrated into ethanol 234. In some embodiments, the removed components 236 (e.g., whole stillage), which comprise water, soluble components, oil, and unfermented solids (e.g., the solids component of the beer with substantially all ethanol removed), can be dried into dried distillers grains (DDG) in a third treatment system 238 (where the removed components 236 can be treated with agents 240) and sold as an animal feed product. Other co-products 244, for example, syrup (and oil contained in the syrup), can also be recovered from the stillage. Water 246 removed from the fermentation product in distillation can be treated for re-use at the plant.

Figure 3:
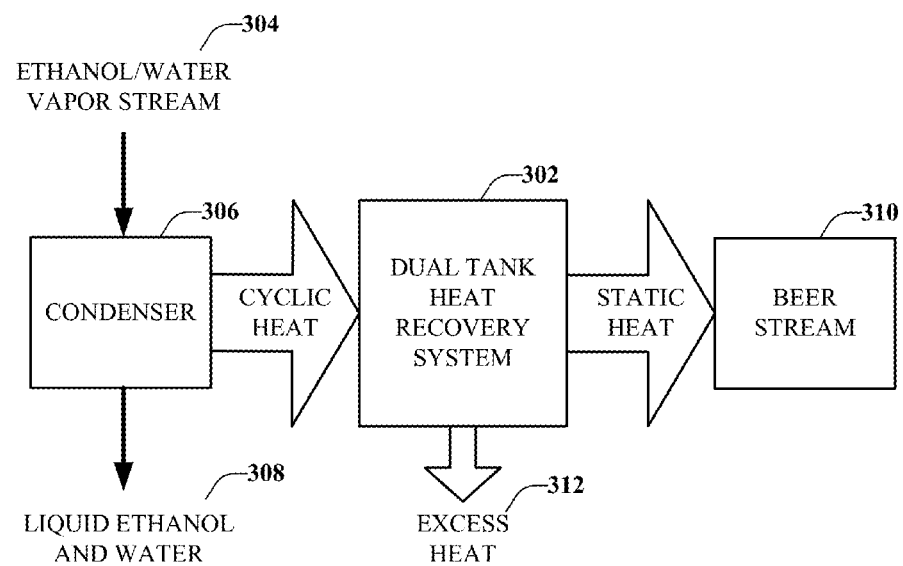
FIG. 3 is a schematic diagram of heat transfer to, and from, a dual tank heat recovery system, in accordance with some embodiments.

Referring now to FIG. 3, an example schematic diagram of heat transfer to, and from, a dual tank heat recovery system 302 is provided. In this example embodiment, hot ethanol and water vapor 304 pass through a condenser 306 on a cyclic basis, as will be described in more detail below. Heat energy is removed from the vapor, thereby condensing the ethanol and water into liquids 308. The heat may be, at least in some part, removed via a heat exchanger and provided to a (hot) storage tank within the dual tank heat recovery system 302. The dual tank heat recovery system 302 may then provide the heat, in a static or continuous manner, to another manufacturing stream (in this figure the beer stream 310). If there is excess heat that the dual tank heat recovery system 302 is incapable of shedding through continuous heating of the beer stream 310 (or other manufacturing stream), the excess heat 312 may be removed by radiator or cooling tower, in accordance with some embodiments.

Figure 4:
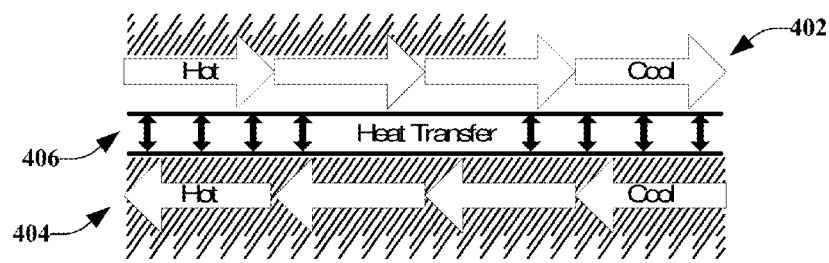
FIG. 4 is a representation of heat transfer between two streams of different temperatures, in accordance with some embodiments.

Referring to FIG. 4, a heat exchanger (e.g., a counter flow plate and frame heat exchanger, such as those manufactured by Alfa Laval, Inc. of Sweden) can be used to transfer heat between two streams 402 and, 404, respectively, of different temperatures that are separated by a heat-conducting surface or wall 406. For example, the heat exchanger can comprise counter current flow, according to an aspect. Additionally, other heat exchanger designs are contemplated as falling within the scope of some embodiments; including for example, tube and shell design heat exchangers. A minimum temperature difference between the streams (e.g., the approach temperature) is approximately 5 degrees Celsius.

The streams 402, 404 can comprise different media (e.g., a first media, a second media, a third media, and so on). The different media can comprise ethanol, water, glycol, water and glycol, and so forth. In an example, the second media can be used to heat a third media. In some aspects, the second media is used to heat the third media continuously. In another aspect, the second media is used to heat the third media from approximately 50 to 58 degrees Celsius to approximately 60 to 68 degrees Celsius.

Heat is transferred from the warmer stream. The warm stream can be a vapor. For each unit of energy transferred from the warmer stream to the cooler stream, the cooler stream must be able to receive each unit of energy. Thus to increase cooling capacity, the system can be made larger with a larger volume of media within the cooling stream. In some systems, the cooling need is intermittent, or can occur in a cyclical fashion. For example, for a first period of time there may be a high need for cooling capacity and for a second period of time there may be a low need for cooling capacity. The energy that is recovered from the cyclical heat cycle can be used to heat another stream that requires heating in a continuous fashion. The disclosed aspects address this need by implementing a dual tank heat transfer system.

The aspects disclosed herein relate to a system that uses condensing and/or cooling of a hot vapor stream in a cyclical fashion, the cycle comprising a first time period and a second time period. In some embodiments, the first time period and the second time period alternate and cooing occurs during the alternating first time period. In an aspect, the second time period can be longer than the alternating first time period. For example, the second time period can be approximately 1.5 to 6 times longer than the alternating first time period.

Figure 5A:
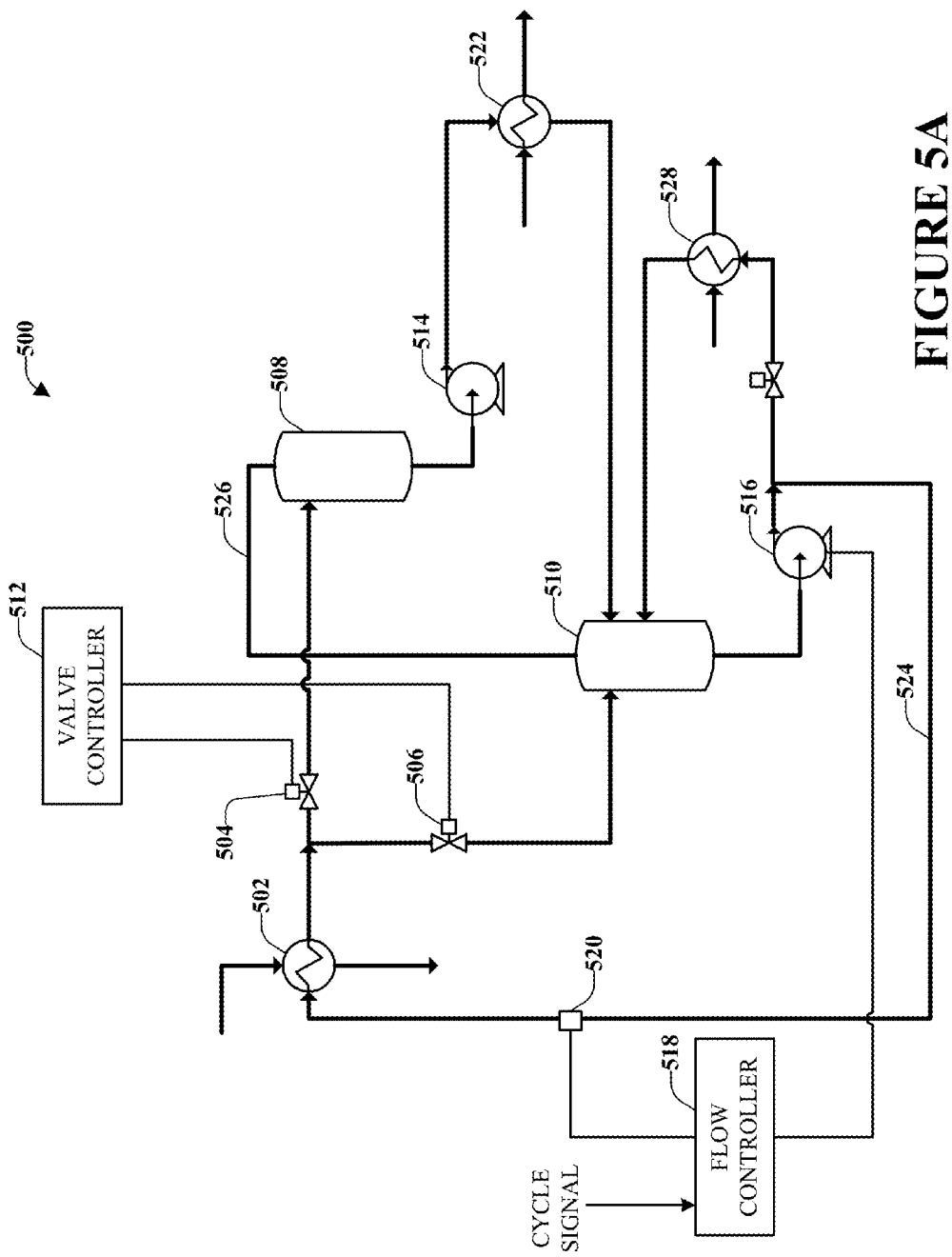
FIGS. 5A, 5B, and 5C are example diagrams of a system for recovering heat using a dual tank heat transfer system, according to some embodiments.
Figure 5B:
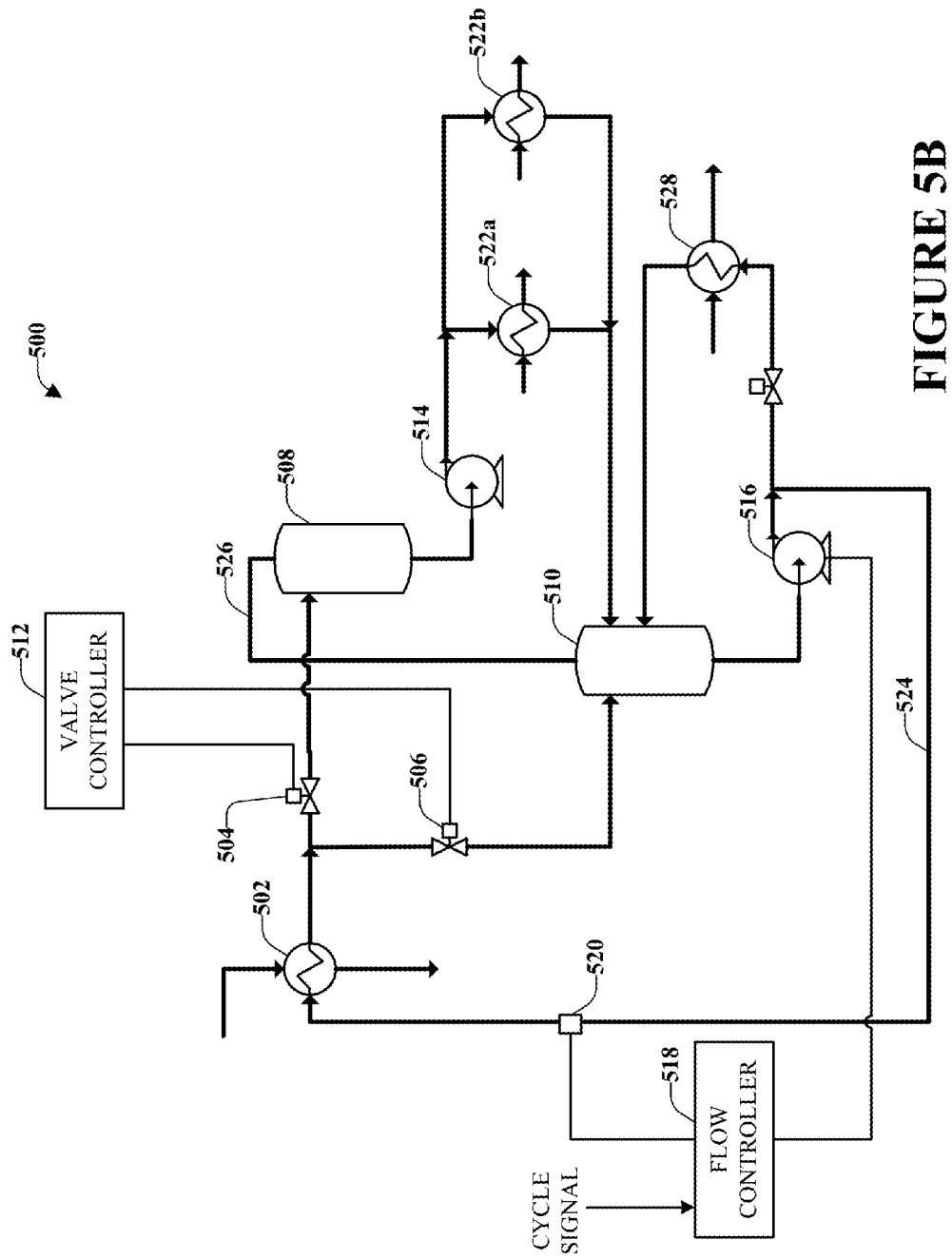
Figure 5C:
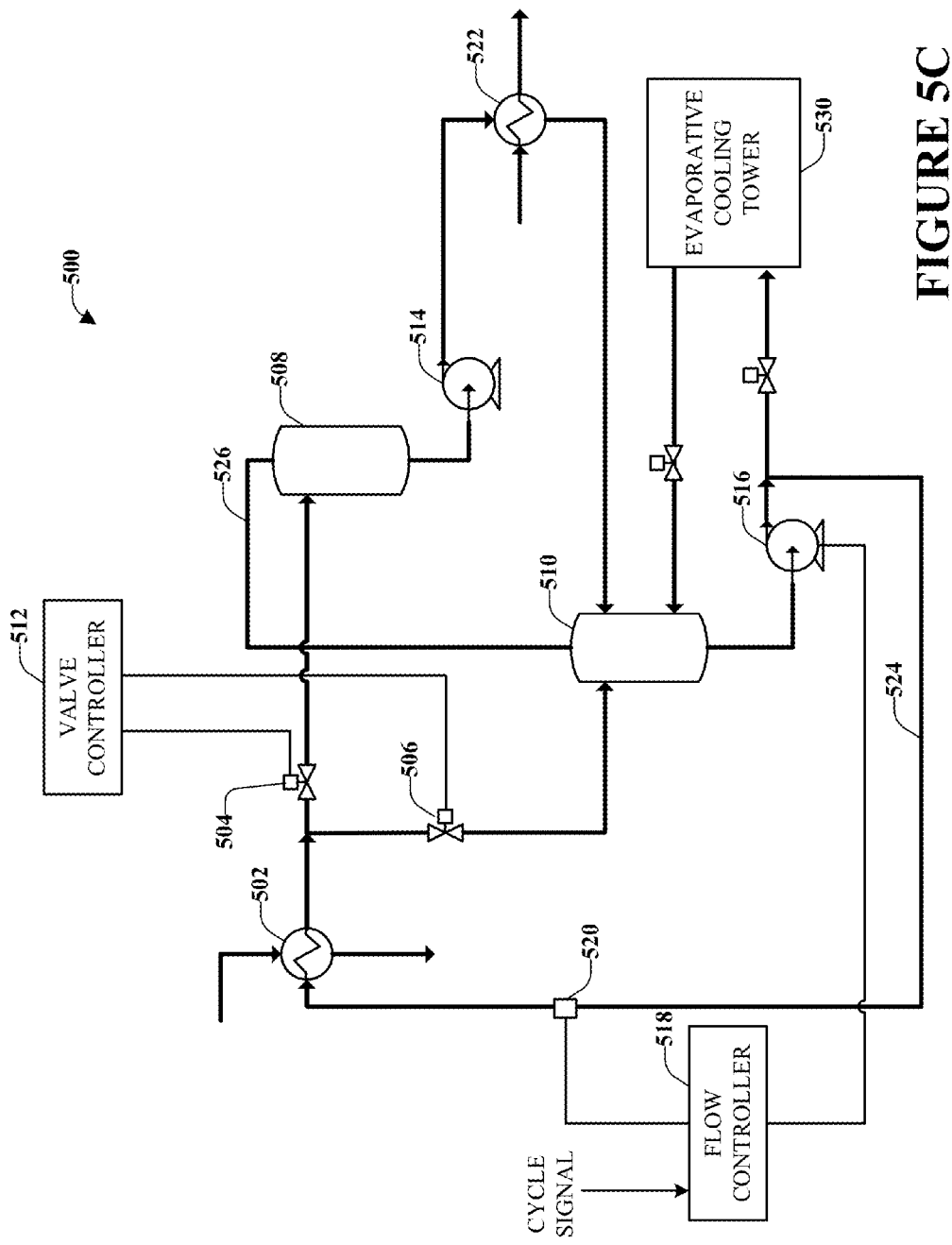

According to some embodiments, as shown in FIGS. 5A, 5B, and 5C, the system 500 comprises a first heat exchanger 502 that is used to recover heat into a coolant stream from a hot vapor stream as it cools and/or condenses. The flow of the coolant is directed by a first valve 504 (coupled to the first heat exchanger 502) and a second valve 506 (coupled to the first heat exchanger 502) that are used to direct the coolant stream into one of two tanks, namely, a first tank 508 coupled to the first valve 504 and a second tank 510 coupled to the second valve 506. In some embodiments, the first valve and second valve may be jointly referred to as a valve system. Alternative valve designs may also be utilized in some embodiments of the dual tank heat exchanger system.

These alternative valve systems may include a three-position valve or a two-way diverter valve, for example.

A valve controller 512 may monitor the temperature of the media coming from the first heat exchanger 502. Temperature data may be utilized by the valve controller 512 in order to direct media flow, using the valves, to either the first tank 508 or the second tank 510. The valve controller 512 may also receive a feed forward signal to provide adaptive predictive valve operation in some embodiments.

Further, flow rates of the particular streams may be likewise regulated by one or more pumps, shown as first pump 514 and second pump 516. In some embodiments, a flow controller 518 monitors flow using a flow transmitter 520. Information regarding when the cycle of the ethanol vapor is sent through the first heat exchanger 502 may be utilized to control the flow of media within the heat exchanger. Thus, the large variations in cooling loads in the first heat exchanger 502 may be met by varying fluid flow as controlled by the first pump 514. As heat supplied to a second heat exchanger 522 is kept constant (or nearly constant), the second pump 516 may be calibrated and maintained at a static mode of operation, in some embodiments.

A pipe line 524 can connect the second tank 510 to the first heat exchanger 502. A cross vent line 526 can connect the first tank 508 to the second tank 510 thereby preventing the tanks from being vented to the atmosphere. By not venting to the atmosphere, there is less likelihood of media evaporation or loss. Additionally, by having a closed system, the media may be operated at pressures above atmospheric pressures in order to maintain a liquid state of the media, expand operational temperature ranges, and the like. In some cases, it may be desirable to include a relief valve in the tanks or cross vent line in order to prevent extraordinarily high pressures within the system. In accordance with some aspects, the first heat exchanger 502 and the second tank 510 form a loop (e.g., feedback loop). According to some aspects, the first tank 508, the second heat exchanger 522, and the second tank 510 form a loop (e.g., feedback loop).

When hot vapor enters the first heat exchanger 502 during the first time period, and the first heat exchanger 502 is in operation heating the coolant stream, the first valve 504 will be opened allowing the heated coolant stream to flow into the first tank 508, which can be a "hot tank". When there is no need for cooling during the second time period and/or the first heat exchanger 502 is not in operation, the first valve 504 closes and a second valve 506 opens allowing the coolant stream to flow into the second tank 510, which can be a "cool tank". The heated coolant stored in the first tank 508 (e.g., "hot tank") is used to heat another stream that requires continuous heating using a second heat exchanger 522. The second heat exchanger 522 can be coupled to the first tank 508 and the second tank 510. The coolant is then recycled back into the second tank 510 (e.g., "cool tank"). The "cool tank" stream may optionally be cycled through a radiator loop or evaporative cooling tower that will maintain the temperature of the coolant stream below a set point. Note, in the embodiment of the system illustrated in FIG. 5B, there may be more than one second heat exchanger 522a, 522b. In fact, any number of heat exchangers is considered within the scope of some embodiments. Such embodiments may be useful where heat is drawn from more than one source, or, as illustrated, supplied to more than one stream. Thus, in such embodiments, the beer stream and some other stream (combustion intake, for example) may both be heated. By varying the flow resistance to each of the more than one second heat exchangers 522a, 522b, varying levels of heat may be supplied to each respective steam.

In accordance with some aspects, the first valve 504 and the second valve 506 have a temperature set point. The first valve 504 and the second valve 506 direct flow from the first heat exchanger 502 to the first tank 508 when the temperature is at or above the temperature set point and to the second tank 510 when the temperature is below the temperature set point. As noted, regulation of the valves may be provided by a valve controller 512. In some embodiments, a temperature transmitter (not illustrated) may monitor the temperature of the media being output from the first heat exchanger 502 in order to determine media direction (e.g., valve operation).

In accordance with some aspects, a third heat exchanger 528 is coupled to the second tank 510. The third heat exchanger can be, for example, a radiator. In some alternative embodiments, as illustrated in FIG. 5C, the third heat exchanger 528 may instead be replaced by an evaporative cooling tower 530 with additional cool media in reservoir. In such embodiments, the temperature of the second "cool" tank 510 may be monitored. If the temperature exceeds some threshold within the "cool" tank, the system may be configured to cycle media between the cooling tower 530 and the second "cool" tank 510 in order to maintain a desired temperature within the second tank 510.

According to an embodiment, the flow rate of the first valve during the first time period of the cycle may be equal to the flow rate of the second valve during the second time period of the cycle. According to an alternative embodiment, the flow rate of the second valve during the second time period is lower than the flow rate of the first valve during the first time period. According to an embodiment, the flow rate of the second valve during the second time period is set at a minimum flow rate that can be sustained by the pump 516.

An example of a cyclical or intermittent cooling need is a stream at an ethanol production facility that originates at a molecular sieve system. For example, the system disclosed herein can be coupled to a distillation system that comprises a molecular sieve system, which, according to an aspect can comprise a regeneration cycle. Ethanol can be produced from grain-based feedstocks (e.g., corn, sorghum/milo, barley, wheat, soybeans, etc.), from sugar (e.g., sugar cane, sugar beets, etc.), or from biomass (e.g., lignocellulosic feedstocks, such as switchgrass, corn cobs and stover, wood, or other plant material). An ethanol facility that produces ethanol from corn typically employs a process wherein corn is ground to a flour, mixed with water and enzymes to break down the starch contained in the corn into sugar (e.g. glucose) and fermented into a fermentation product (e.g. beer) by yeast. The ethanol is recovered from the fermentation product in a distillation system and is dehydrated using molecular sieves. As shown in FIGS. 5A, 5B, and 5C, the depress condenser 502 is used to condense ethanol vapor from the regeneration phase of the molecular sieve system that is used to dehydrate the final product (e.g., ethanol), producing a high energy vapor stream that comprises approximately 50 to 95 percent ethanol in water (with an average ethanol concentration of 74 percent), and a temperature of approximately 150 degrees Celsius. The ethanol stream is condensed and cooled to approximately 74 degrees Celsius in a heat exchanger 502 (e.g. a depress condenser). The depressurization phase of the regeneration cycle may last about 2 minutes, and occurs about once every 5 minutes, with three minute time intervals between cycles, causing an intermittent need for high cooling capacity, in some embodiments. Thus, during periods of high cooling capacity, cool media from the second tank 510 may be supplied to the first heat exchanger 502. The second media is heated and directed to the first "hot" tank 508 for storage and downstream heating. An example of a stream that requires continuous heating is the beer stream prior to distillation. In such an example, the intermittently available heat from the ethanol vapor stream that has been captured using the dual tank heat transfer system in the "hot" tank may then be used to heat the beer stream requiring continuous heating. Thus, in this example, the heated medium may be supplied from the first tank 508 to the second heat exchanger 522 on a continual basis to heat the beer stream. This cools the media, which may then be cycled back to the second "cool" tank 510 for reuse in the cyclic cooling process.

The flow rates of the system may be adjusted to accommodate the size of the system and the cooling and heating needs of the facility. According to an exemplary embodiment, at a typical ethanol plant producing 227 million liters of ethanol per year (or 60 million gallons per year). The flow rate of the ethanol vapor may be about 74 kg/min (or 9800 pounds per hour); thus, the flow rate of the first valve during the first time period and the flow rate of the second valve during the second time period may be about 2800 L/min (750 gallons per minute), in some embodiments. According to an alternative embodiment, the flow rate of the second valve during the second time period is about 1300 L/min or less (350 gallons per minute). According to an embodiment, the flow rate of the second valve during the second time period is set at a minimum flow rate that can be sustained by the pump used in the system, for example about 190 L/min (50 gallons per minute).

The system of the disclosed aspects is most applicable to streams where one stream releases large amounts of heat in a cyclical fashion that needs to be transferred to another stream that needs a steady supply of a lower amount of heat. According to an embodiment, the temperature change in the hot media may be about 60 to 80 degrees Celsius (e.g. from 150 degrees Celsius down to 75 degrees Celsius). Any thermal fluid (e.g., a fluid with a high heat capacity) can be chosen as the cooling media, for example, water, oil, glycol, or a water-glycol mixture. Example temperature ranges for the media are: water 2 to 180 degrees Celsius, oil 38 to 430 degrees Celsius, glycol −50 to 200 degrees Celsius, and glycol-water (50:50) −40 to 175 degrees Celsius. The system can be pressurized to keep the media in a liquid phase.

According to an embodiment, the volume of the "hot tank" may be about 1 to 5 times the volume of the media needed for each cycle of heat transfer. According to an embodiment, the volume of the "hot tank" may be about 2 to 3 times the volume of the media needed for each cycle of heat transfer. According to an embodiment, the "hot tank" and the "cool tank" may be connected by a line 526 that allows vapor to vent from the "hot tank" into the "cool tank", and allows excess liquid to drain from the "hot tank" into the "cool tank" under upset conditions.

A series of limited examples were conducted according to an exemplary embodiment of the system (as shown in FIG. 5A) in an effort to determine suitable apparatus and operating conditions for the separation of pre-treated biomass. The following example is intended to provide clarity to some embodiments of systems and means of operation; given the limited nature of this example, it does not limit the scope of the aspects presented herein.

Example 1

The dual tank heat recovery system (as shown in FIG. 5A) can be used to condense and cool an ethanol/water vapor and to heat a beer stream at an ethanol production facility. A stream of approximately 74 kg/min of 73.5 percent ethanol in water vapor mixture can be cooled with water from 149 degrees Celsius to 74 degrees Celsius. Each cycle lasts approximately 2 minutes, and occurs once every 5 minutes. The temperature of the incoming water is 63 degrees Celsius. Two tanks of 11500 L each can be used as a "hot tank" and a "cool tank", and a plate-and-frame heat exchanger can be used as the depressurizing condenser. The flow of the water from the depressurizing condenser can be controlled such that if the temperature of the water is 82 degrees Celsius or more, it will be directed to the "hot tank", and if the temperature is less than 82 degrees Celsius, it will be directed to the "cool tank". A pipe can be used to connect the tanks to vent vapors from the "hot tank" to the "cool tank". Water from the hot tank can be used to heat a beer stream from 54 degrees to 64 degrees Celsius using a plate-and-frame heat exchanger. The temperature of the water in the "cool tank" can optionally be controlled at or below 63 degrees Celsius by circulating the water through a radiator or through an evaporative cooling tower. The dual tank heat recovery system can provide more cooling capacity without increasing the size of the heat exchanger. Further, the dual tank heat recovery system can reduce water loss to evaporative cooling by at least 1800 L/h (475 gal/h) and can provide energy savings of 5.76 MMBTU/h (Million Metric British Thermal Units per hour).

The embodiments as disclosed and described in the application (including the FIGURES and Examples) are intended to be illustrative and explanatory of the disclosed aspects. Modifications and variations of the disclosed embodiments, for example, of the apparatus and processes employed (or to be employed) as well as of the compositions and treatments used (or to be used), are possible; all such modifications and variations are intended to be within the scope of the subject disclosure.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

What is claimed is:

1. A system for transferring heat from a hot vapor stream, the system comprising:
    a first heat exchanger for recovering heat into at least a portion of a coolant stream from the hot vapor stream;
    a valve system coupled to the first heat exchanger, wherein the valve system directs a flow of the coolant stream;
    a first tank coupled to said valve system, wherein the first tank holds a portion of the coolant stream that has a temperature equal to or greater than a temperature set point;

a second tank coupled to said valve system, wherein the second tank holds a portion of the coolant stream that has a temperature less than the temperature set point;

a second heat exchanger coupled to the first tank and the second tank, wherein the second heat exchanger transfers heat from the portion of the coolant stream held in the first tank to another stream;

a pipe line connecting the second tank to the first heat exchanger; and a cross vent line that connects the first tank to the second tank; wherein the cross vent line prevents the first and the second tank from being vented to an outside atmosphere.

2. The system of claim 1, wherein the valve system is directly coupled to at least one of the first heat exchanger, the first tank, and the second tank.

3. The system of claim 1, wherein the valve system comprises a first valve and a second valve, wherein the first valve couples to the first tank and the second valve couples to the second tank.

4. The system of claim 3, wherein the first valve is further coupled directly to the first heat exchanger.

5. The system of claim 3, wherein the first tank is directly coupled to the first valve.

6. The system of claim 3, wherein the second valve is directly coupled to the first heat exchanger.

7. The system of claim 3, wherein the second tank is directly coupled to the second valve.

8. The system of claim 3, further comprising a valve controller configured to direct flow of the coolant stream from the first heat exchanger based on temperature, wherein the coolant stream flows directly through either the first valve or the second valve.

9. The system of claim 8, wherein the first valve and the second valve direct the flow of the coolant stream from the first heat exchanger to the first tank when the temperature is at or above the temperature set point and to the second tank when the temperature is below the temperature set point.

10. The system of claim 1, wherein the second heat exchanger is directly coupled to the first tank and the second tank.

11. The system of claim 1, further comprising a third heat exchanger coupled to the second tank.

12. The system of claim 11, wherein the third heat exchanger is a radiator.

13. The system of claim 1, wherein the first heat exchanger and the second tank form a loop.

14. The system of claim 1, wherein the first tank, the second heat exchanger, and the second tank form a loop.

15. A method for transferring heat according to the system of claim 1, comprising:
intermittently cooling a first media comprising the hot vapor stream in the first heat exchanger wherein heat is transferred to a second media comprising the coolant; and
directing the second media to the valve system that has a temperature set point, wherein the valve system directs a flow of the second media to the first tank when a temperature of the second media is above the temperature set point, and wherein the valve system directs the flow of the second media to the second tank when the temperature of the second media is below the temperature set point; and
preventing the first tank and the second tank from venting to an outside atmosphere, wherein an inside atmosphere is directed between the first tank and the second tank by the cross vent line.

16. The method of claim 15, wherein the directing comprises directing the second media to the valve system that comprises a first valve and a second valve, and wherein the first valve opens and the second valve closes directing the flow of the second media to the first tank when the temperature of the second media is above the temperature set point, and wherein the first valve closes and the second valve opens directing the flow of the second media to the second tank when the temperature of the second media is below the temperature set point.

17. The method of claim 15, wherein the intermittently cooling the first media comprises condensing.

18. The method of claim 15, wherein the intermittently cooling comprises intermittently cooling the first media comprising ethanol and water.

19. The method of claim 18, wherein the first media comprises ethanol at a concentration of approximately 50 to 95 percent.

20. The method of claim 15, wherein the intermittently cooling comprises a first time period and a second time period that alternate, and wherein the cooling occurs during the alternating first time period.

21. The method of claim 20, wherein the second time period is longer than the alternating first time period.

22. The method of claim 21, wherein the second time period is approximately 1.5 to 6 times longer than the alternating first time period.

23. The method of claim 20, wherein the second media is heated to approximately 80 to 85 degrees Celsius during the alternating first time period.

24. The method of claim 15, wherein the first heat exchanger comprises counter current flow.

25. The method of claim 15, wherein the second media is used to heat a third media.

26. The method of claim 25, wherein the second media is used to heat the third media continuously.

27. The method of claim 25, wherein the second media is used to heat the third media from approximately 50 to 58 degrees Celsius to approximately 60 to 68 degrees Celsius.

28. The method of claim 15, wherein the second media comprises water.

29. The method of claim 15, wherein the second media comprises glycol.

30. The method of claim 15, wherein the second media comprises water and glycol.

31. The method of claim 15, wherein the second media operates at pressures above atmospheric level.

32. The system of claim 1, wherein the first heat exchanger, the valve system, the first tank, the second tank, the second heat exchanger, the pipe line, and the cross vent line form a closed system, the closed system operated at a pressure higher than atmospheric pressure.

* * * * *